United States Patent
Wong

(10) Patent No.: US 12,304,776 B2
(45) Date of Patent: May 20, 2025

(54) TRAVEL-SPEED BASED PREDICTIVE DISPATCHING

(71) Applicant: Otis Elevator Company, Farmington, CT (US)

(72) Inventor: Sam Thieu Wong, Bridgeport, CT (US)

(73) Assignee: OTIS ELEVATOR COMPANY, Farmington, CT (US)

( * ) Notice: Subject to any disclaimer, the term of this patent is extended or adjusted under 35 U.S.C. 154(b) by 1367 days.

(21) Appl. No.: 16/909,120

(22) Filed: Jun. 23, 2020

(65) Prior Publication Data

US 2021/0395038 A1     Dec. 23, 2021

(51) Int. Cl.
*B66B 1/46*     (2006.01)
*B66B 1/24*     (2006.01)
(Continued)

(52) U.S. Cl.
CPC ............ *B66B 1/468* (2013.01); *B66B 1/2408* (2013.01); *B66B 1/3461* (2013.01); *B66B 3/002* (2013.01);
(Continued)

(58) Field of Classification Search
CPC ..... B66B 1/468; B66B 1/2408; B66B 1/3461; B66B 3/002; B66B 2201/101;
(Continued)

(56) References Cited

U.S. PATENT DOCUMENTS

| | | | | | |
|---|---|---|---|---|---|
| 4,802,557 A | * | 2/1989 | Umeda | ................. | B66B 1/2408 187/387 |
| 5,035,302 A | * | 7/1991 | Thangavelu | .......... | B66B 1/2408 187/382 |

(Continued)

FOREIGN PATENT DOCUMENTS

| CN | 105764827 A | 7/2016 |
|---|---|---|
| CN | 110203782 A | 9/2019 |

(Continued)

OTHER PUBLICATIONS

China Office Action for China Application No. 202011387908.4; Date of Action Nov. 23, 2022; 11 pages.

(Continued)

*Primary Examiner* — Jeffrey Donels
(74) *Attorney, Agent, or Firm* — CANTOR COLBURN LLP

(57) ABSTRACT

An aspect includes a system with a communication interface configured to receive a mobile device location indicator at a first location and a second location. The system also includes a memory system and a processing system configured to perform operations. The operations include detecting a mobile device at the first location and observing a current state of one or more conditions present during detection of the mobile device. A travel prediction of the mobile device between the first location and the second location is determined based on a travel history of the mobile device and the current state of the one or more conditions. A command is output to a dispatching system based on detection of the mobile device at the first location and the travel prediction of the mobile device to align with a predicted arrival of the mobile device at the second location.

20 Claims, 3 Drawing Sheets

(51) Int. Cl.
 *B66B 1/34* (2006.01)
 *B66B 3/00* (2006.01)
 *H04W 4/029* (2018.01)

(52) U.S. Cl.
 CPC ....... *H04W 4/029* (2018.02); *B66B 2201/101* (2013.01); *B66B 2201/232* (2013.01); *B66B 2201/405* (2013.01); *B66B 2201/4638* (2013.01); *B66B 2201/4653* (2013.01)

(58) Field of Classification Search
 CPC ........ B66B 2201/232; B66B 2201/405; B66B 2201/4638; B66B 2201/4653; B66B 2201/4615; B66B 1/06; B66B 1/3423; B66B 1/3492; B66B 5/0018; B66B 2201/20; B66B 2201/46; H04W 4/029
 See application file for complete search history.

(56) References Cited

U.S. PATENT DOCUMENTS

| | | | |
|---|---|---|---|
| 6,257,373 B1 * | 7/2001 | Hikita | B66B 1/2458 187/387 |
| 10,207,893 B2 | 2/2019 | Elomaa et al. | |
| 10,934,132 B2 * | 3/2021 | Troesch | G05B 15/02 |
| 11,040,849 B2 | 6/2021 | Daniels et al. | |
| 2013/0245832 A1 * | 9/2013 | Blom | H04W 4/029 700/275 |
| 2017/0137255 A1 * | 5/2017 | Simcik | B32B 27/08 |
| 2018/0334357 A1 | 11/2018 | Finn et al. | |
| 2019/0002234 A1 * | 1/2019 | Shinohe | B66B 1/3446 |
| 2019/0263626 A1 | 8/2019 | Daniels et al. | |
| 2019/0346588 A1 | 11/2019 | Hsu | |
| 2019/0382235 A1 | 12/2019 | Pahlke et al. | |
| 2020/0095090 A1 * | 3/2020 | Wei | B66B 1/468 |

FOREIGN PATENT DOCUMENTS

| | | | | |
|---|---|---|---|---|
| EP | 3556703 A1 * | 10/2019 | | B66B 1/14 |
| WO | WO-2015094178 A1 * | 6/2015 | | B66B 1/3461 |
| WO | WO-2015180771 A1 * | 12/2015 | | B66B 1/468 |
| WO | WO-2016100293 A1 * | 6/2016 | | B66B 1/3461 |

OTHER PUBLICATIONS

Extended EP Search Report for Application No. 20213518.2-1017; Date of Mailing: May 14, 2021; 7 pages.

* cited by examiner

TRAVEL-SPEED BASED PREDICTIVE DISPATCHING

BACKGROUND

Exemplary embodiments pertain to the art of conveyance systems, and specifically to travel-speed based predictive dispatching for a conveyance system.

In present high-rise buildings, conventional elevator systems may require passengers to take multi-segment trips (e.g., ride multiple elevators) to get to their destination. In turn, the conventional elevator systems of the high-rise buildings may require the passengers to learn a layout of the high-rise buildings (e.g., which elevators serve which floors) to initiate and accomplish these multi-segment trips.

The travel speed of people through various environments may change based on traffic patterns, congestion, familiarity with the environment, and other factors. The walking pace of people may change, for example, between different segments of a multi-segment trip. For larger distances between monitored locations, the variations in travel speed of individuals can substantially deviate from the average travel speed of a group of people creating inefficiencies in the dispatching algorithms.

BRIEF DESCRIPTION

Disclosed is a system including a communication interface configured to receive a mobile device location indicator at a first location and a second location. The system also includes a memory system configured to store a plurality of program instructions and a processing system configured to execute the program instructions to cause the processing system to perform a plurality of operations. The operations include detecting a mobile device at the first location and observing a current state of one or more conditions present during detection of the mobile device. A travel prediction of the mobile device between the first location and the second location is determined based on a travel history of the mobile device and the current state of the one or more conditions. A command is output to a dispatching system based on detection of the mobile device at the first location and the travel prediction of the mobile device to align with a predicted arrival of the mobile device at the second location.

In addition to one or more of the features described above, or as an alternative, further embodiments may include where the processing system is further configured to perform operations of measuring a travel time of the mobile device between the first location and the second location separated by a known distance, and recording a plurality of metadata associated with the one or more conditions present during measurement of the travel time of the mobile device.

In addition to one or more of the features described above, or as an alternative, further embodiments may include where the processing system is further configured to perform operations of determining a rate of travel of the mobile device based on the travel time and the known distance, and recording the rate of travel of the mobile device with the metadata as a travel rate history.

In addition to one or more of the features described above, or as an alternative, further embodiments may include where determining the travel prediction of the mobile device is based on the metadata.

In addition to one or more of the features described above, or as an alternative, further embodiments may include where the one or more conditions include one or more of: a date/time condition, a level of congestion between the first location and the second location, a weather condition, and a characteristic of a space between the first location and the second location.

In addition to one or more of the features described above, or as an alternative, further embodiments may include where the processing system is further configured to perform operations of identifying a mobile device group including the mobile device and one or more other mobile devices at the first location, tracking a group time for the mobile device group to move from the first location to the second location, and incorporating the group time into a subsequent travel prediction of the mobile device based on a subsequent identification of the mobile device group at the first location.

In addition to one or more of the features described above, or as an alternative, further embodiments may include where the dispatching system is configured to control arrival and departure of a conveyance apparatus at the second location.

In addition to one or more of the features described above, or as an alternative, further embodiments may include where the conveyance apparatus is an elevator car.

In addition to one or more of the features described above, or as an alternative, further embodiments may include where the dispatching system is configured to output information to a display based on the predicted arrival of the mobile device at the second location.

In addition to one or more of the features described above, or as an alternative, further embodiments may include where the dispatching system is configured to enable access to an access-controlled apparatus at the second location based on the predicted arrival of the mobile device at the second location.

Also disclosed is a method that includes detecting, by a processing system, a mobile device at a first location and observing a current state of one or more conditions present during detection of the mobile device. A travel prediction of the mobile device between the first location and the second location is determined based on a travel history of the mobile device and the current state of the one or more conditions. A command is output to a dispatching system based on detection of the mobile device at the first location and the travel prediction of the mobile device to align with a predicted arrival of the mobile device at the second location.

In addition to one or more of the features described above, or as an alternative, further embodiments may include measuring a travel time of the mobile device between the first location and the second location separated by a known distance, and recording a plurality of metadata associated with the one or more conditions present during measurement of the travel time of the mobile device.

In addition to one or more of the features described above, or as an alternative, further embodiments may include determining a rate of travel of the mobile device based on the travel time and the known distance, and recording the rate of travel of the mobile device with the metadata as a travel rate history.

In addition to one or more of the features described above, or as an alternative, further embodiments may include identifying a mobile device group comprising the mobile device and one or more other mobile devices at the first location, tracking a group time for the mobile device group to move from the first location to the second location, and incorporating the group time into a subsequent travel prediction of the mobile device based on a subsequent identification of the mobile device group at the first location.

BRIEF DESCRIPTION OF THE DRAWINGS

The following descriptions should not be considered limiting in any way. With reference to the accompanying drawings, like elements are numbered alike.

DETAILED DESCRIPTION

Figure 1:
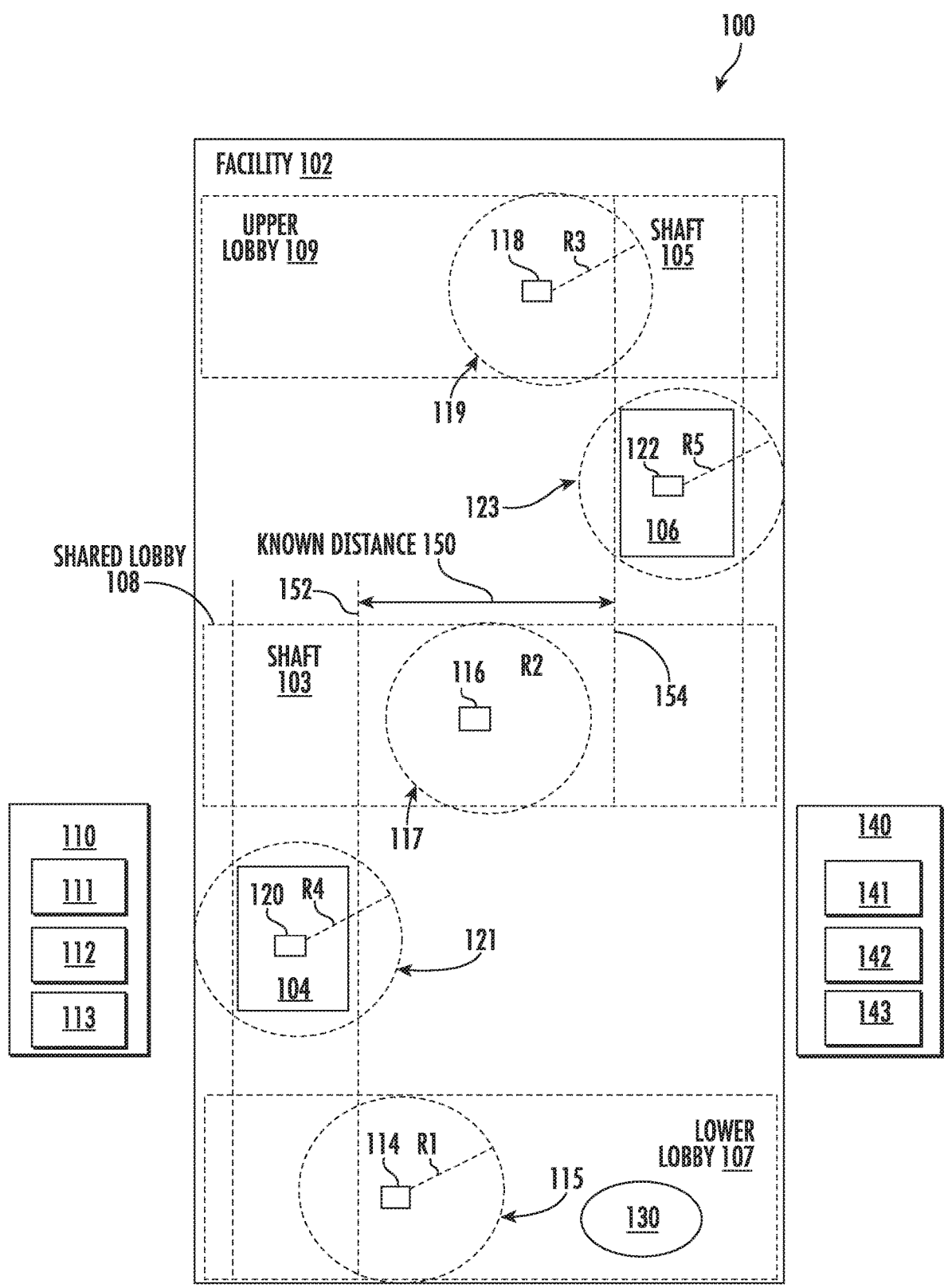
FIG. 1 is an environment for travel-speed based predictive dispatching for a conveyance system according to one or more embodiments of the present disclosure.

A detailed description of one or more embodiments of the disclosed apparatus and method are presented herein by way of exemplification and not limitation with reference to the Figures.

In accordance with one or more embodiments, a dispatching system for a conveyance apparatus or other access-controlled apparatus can predictively schedule arrival of the conveyance apparatus, opening of the access-controlled apparatus, or display of information to align with a predicted arrival time of a user at a specific location. In embodiments, a system can interface with a mobile device of a user to detect when the mobile device is at a first location having a known distance from a second location, where the second location is a targeted location of the conveyance apparatus, the access-controlled apparatus, or the display. For example, the conveyance apparatus may be an elevator, where access to an elevator car of the elevator may be constrained by a level of usage and movement between floors of a building. The access-controlled apparatus may be a gate, turnstile, door, or other such apparatus having a locking mechanism or other such constraint to limit access. The display may provide user-specific instructions as to where a targeted user should go, such as instructions to select a specific elevator car at the second location. Embodiments are generally described with respect to a multiple-ride elevator system but may also be applicable to many other types of systems and configurations.

With respect to a multiple-ride elevator system, a control system may interface with mobile devices absent direct user interaction. This can provide a hands-free mechanism for passengers to get to a desired destination floor based on sequential interactions between two or more location devices and a mobile device. For instance, the hands-free mechanism can operate to determine and execute an elevator call based on an initial interaction of the mobile device with a first of the two or more location devices and a subsequent interaction of the mobile device with a second of the two or more location devices. In order to predictively dispatch an elevator car or other conveyance apparatus to a second location prior to a user reaching the second location, embodiments can predict an arrival time of a user at the second location based on detecting a mobile device of the user at a first location and predicting when the user will arrive at the second location. Rather than using a predetermined average rate of travel for all users, embodiments can learn the pace of individual users who follow the same route between the first location and the second location over multiple iterations.

Further refinements can be made by observing one or more conditions present when the rate of travel is determined and for conditions that result in a deviation to the rate of travel for the user. Observation of similar conditions at subsequent times when rate of travel prediction is performed can be used to adjust a predicted rate of travel. For example, time of day, day of week, month, season, or other such date/time values can be used to identify patterns that repeat for particular users and/or groups of users. Other conditions can include observed or derived conditions based on supplemental data, such as weather data, event data, traffic/congestion level, and the like. For instance, users may walk slower inside of a building when they have entered on a rainy or snowy day. If an event is scheduled that will likely increase the number of people in the area, the predicted rate of travel may be reduced. Further, detecting a larger number of mobile devices interacting with the system around the same time can indicate a higher traffic/congestion situation that may result in slower predicted travel speeds. Further, a higher traffic/congestion situation may be detected using various sensors, such as cameras, depth sensors, floor pressure sensors, light beams, and the like.

FIG. 1 depicts an environment for travel-speed based predictive dispatching for a conveyance system according to one or more embodiments. In the example of FIG. 1, the conveyance system is an elevator system 100. It is understood that while elevator system 100 is utilized for exemplary illustration, embodiments disclosed herein may be applied to other conveyance systems utilizing conveyance apparatuses for transportation such as, for example, trams, shuttles, trains, buses, car taxi/ride sharing systems, etc. The environment can include a facility 102 (e.g., a high-rise building) comprising at least one elevator shaft supporting at least one elevator car. As shown in FIG. 1, the facility 102 includes an elevator shaft 103 supporting an elevator car 104 and an elevator shaft 105 supporting an elevator car 106. The elevator car 104 can be accessed at least at a lower lobby 107 (e.g., a ground floor of the facility 102) and a shared lobby 108 (e.g., a middle floor of the facility 102). Further, the elevator car 106 can be accessed at least at the shared lobby 108 and an upper lobby 109 (e.g., a top floor of the facility 102). In this regard, the elevator shaft 103 only permits the elevator car 104 to travel between a lower floor and a middle floor (which can be considered an initial segment), and the elevator shaft 105 only permits the elevator car 106 to travel between the middle floor and a top floor (which can be considered a subsequent segment). The arrangement of elevator shafts 103 and 105 is for exemplary purposes only and any desired arrangement and number of elevator shafts and elevator cars may be used. In one embodiment, elevator cars 104 and 106 may be able to serve and stop at any desired floors.

The environment of FIG. 1 comprises a computer system 110. The computer system 110 includes a processing system 111, a memory system 112, and a communication interface 113. The memory system 112 stores program instructions that are executable by the processing system 111 to cause performance of operations as further described herein. The computer system 110 can support and/or be a part of an elevator system 100 that operates the elevator cars 104 and 106. The elevator system 100 can include or communicate with one or more location devices and/or mobile devices through the communication interface 113.

In accordance with one or more embodiments, the one or more location devices can include a location device 114 with a location zone 115 (extending a radius R1), a location device 116 with a location zone 117 (extending a radius R2), a location device 118 with a location zone 119 (extending a radius R3), a location device 120 with a location zone 121 (extending a radius R4), and/or a location device 122 with a location zone 123 (extending a radius R5). The location device 114 can be located within and correspond thereto the lower lobby 107. The location device 116 can be located within and correspond thereto the shared lobby 108. The location device 118 can be located within and correspond thereto the upper lobby 109. The location device 120 can be located within and correspond thereto the elevator car 104. The location device 122 can be located within and correspond thereto the elevator car 106. Each radius R1, R2, R3, R4, R5 of each location zone 115, 117, 119, 121, 123 can be predetermined and configured within the elevator system 100, such as at a distance of a width of a lobby or an elevator car. The elevator system 100 interacts with a mobile device (e.g., mobile device 130) to provide a hands-free user interface for generating elevator calls. Moreover, any location zone and location device may be placed as desired within the environment of FIG. 1 and the elevator system 100, such as in an elevator fixture. In one embodiment, the location zone may be rectangular, planar, 3-dimensional, or any other desired shape and/or size. Although only one mobile device 130 is depicted for purposes of explanation, it will be understood that the elevator system 100 can interact with multiple mobile devices 130 as multiple users move about within the facility 102.

The environment of FIG. 1 and the elevator system 100 described herein is an example and is not intended to suggest any limitation as to the scope of use or operability of embodiments described herein (indeed additional or alternative components and/or implementations may be used). Further, while single items are illustrated for items of the environment of FIG. 1, these representations are not intended to be limiting and thus, any item may represent a plurality of items. Embodiments of the environment of FIG. 1 and the elevator system 100 can include configurations for a mobile device centric system (e.g., when one or more location devices advertise a trigger signal, and the mobile device 130 detects trigger signals from the one or more location devices), a location device centric system (e.g., when the mobile device 130 advertises a trigger signal, and the one or more location devices detects trigger signals from the mobile device 130), or a combination thereof. Further, embodiments of the environment of FIG. 1 and the elevator system 100 can include configurations for a lobby focused system, an elevator focused system, or a combination thereof.

The environment of FIG. 1 and the elevator system 100 can satisfy single-segment elevator trips and multi-segment elevator trips. In accordance with one or more embodiments, if multiple event triggers are placed on a same floor, the environment of FIG. 1 and the elevator system 100 can detect a sequence of these multiple event triggers to automatically place a single-segment trip. Further, the environment of FIG. 1 and the elevator system 100 can determine how many elevator trip segments are required for the multi-segment trip and what guidance should be provided to a user during the multi-segment trip.

The computer system 110 can include any processing hardware, software, or combination of hardware and software utilized by the elevator system 100 to carry out computer readable program instructions by performing arithmetical, logical, and/or input/output operations. The computer system 110 can be implemented local to the facility 102, remote to the facility 102, or as a cloud service. The computer system 110 can be representative of a plurality of computers dispersed throughout the environment of FIG. 1 and the elevator system 100. The processing system 111 can comprise one or more central processing units (CPU(s)), also referred to as processing circuits, coupled via a system bus to the memory system 112 and various other internal or external components (e.g., the location devices 114, 116, 118, 120, and 122). The memory system 112 can include a read-only memory (ROM) and a random-access memory (RAM). The computer system 110, by utilizing the processing system 111, the memory system 112, and the communication interface 113, operates to provide/support automatic calls of the elevator system 100 for navigation in the facility 102 with respect to elevator trips. The computer system 110, by utilizing the processing system 111 and the memory system 112, operates to support the hands-free user interface of the mobile device 130 for navigation in the facility 102 with respect to any elevator trip. The computer system 110, by utilizing the processing system 111, the memory system 112, and the communication interface 113, can operate to communicate with the location devices 114, 116, 118, 120, and 122. The computer system 110 can also determine a status of each elevator car 104 and 106, such as which floor an elevator car is located, which direction an elevator car is traveling, a number of stops designated for an elevator trip, an elevator door position, an elevator door operation (opening vs. closing), etc. The computer system 110 can operate one or more timers (e.g., movement timers and disconnect timers) with respect to the operations described herein.

The location devices 114, 116, 118, 120, and 122 can be electro-mechanical components that generate corresponding location zones 115, 117, 119, 121, and 123. Examples of the location devices 114, 116, 118, 120, and 122 include radio devices, such as Wi-Fi devices, Bluetooth devices, wireless beacon devices, etc. The location devices 114, 116, 118, 120, and 122 can utilize software and/or firmware to carry out operations particular thereto. In this regard, the location devices 114, 116, 118, 120, and 122 can be configured to provide triggering signals (e.g., one-way communication devices advertising a location; a radio signal being broadcast to the mobile device 130). For example, the location devices 114, 116, 118, 120, and 122 themselves can provide a triggering signal to the mobile device that causes the mobile device 130 to place an elevator call, e.g., if the mobile device 130 receives a correct event trigger sequence, with is a set of ordered interactions between the mobile device 130 and the location devices 114, 116, 118, 120, and 122.

The location devices 114, 116, 118, 120, and 122 can include transceivers (e.g., communications and/or interface adapter) that can communicate with the computer system 110 and/or the mobile device 130. The location devices 114, 116, 118, 120, and 122 may communicate with the computer system 110 with wires or wirelessly. In this regard, the location devices 114, 116, 118, 120, and 122 can be configured to detect the mobile device 130 (e.g., continuously sensing the mobile device 130; the mobile device 130 altering a field of the corresponding location zone) and/or communicate with the mobile device 130 with respect to the corresponding location zones 115, 117, 119, 121, and 123. For example, the location devices 114, 116, 118, 120, and 122 themselves can automatically cause the execution of an elevator call based on one or more event trigger sequences respective to interactions with the mobile device 130. Further, the location devices 114, 116, 118, 120, and 122 can generate one or more electrical signals to the computer system 110 as a function of the mobile device detection (e.g., generates an electrical signal in response to detecting a presence of the mobile device 130) and/or the mobile device communication.

The mobile device 130 can include any processing hardware, software, or combination of hardware and software utilized to carry out computer readable program instructions by performing arithmetical, logical, and/or input/output operations. The mobile device 130 can include any wireless device operated by a passenger, such as a laptop, a tablet computer, a mobile phone, a smartphone, a wireless beacon on the user (e.g., an electronic bracelet), radio frequency identification card, smartwatches, implants, smart glasses, wearable components, a robot (e.g., a cleaning robot, a delivery robot, etc.), and the like. The mobile device 130 can interact/detect/communicate with the one or more location devices of the elevator system 100, can support/provide/execute an application and a hands-free user interface, and can connect to the computer system 110 or a server 140 (wirelessly through an internet, cellular, or cloud connection). The mobile device 130 can also include a microelectromechanical system (MEMS) sensor configured to detected accelerations of the mobile device 130. The MEMS sensor may be a sensor such as, for example, an accelerometer, a gyroscope, or a similar sensor known to one of skill in the art.

The server 140, comprising a processing system 141, a memory system 142, and a communication interface 143 as described herein, can include any processing hardware, software, or combination of hardware and software in communication with the mobile device 130 to carry out computer readable program instructions by performing arithmetical, logical, and/or input/output operations. The server 140 can be implemented local to the facility 102, remote to the facility 102, or as a cloud service to the mobile device 130. The server 140, by utilizing the processing system 141, the memory system 142, and communication interface 143, operates to support automatic calls executed by the mobile device 130.

In accordance with one or more embodiments, the mobile device 130 executes elevator calls in response to one or more event trigger sequences based on a logic in the application (to interpret a correct sequence). The application allows the mobile device 130 to send messages via cellular towers or other communication means (provide information over the internet to cloud-based internet servers, such as the server 140 or locally through location devices using short range wireless communication, such as, for example, Bluetooth). Further, the location devices 114, 116, 118, 120, 122 and/or other communication devices may support data exchange between various devices as part of a communication network. The server 140 can in turn send elevator requests to the elevator controllers (e.g., the computer system 110) in a specific building (e.g., the facility 102). Thus, the mobile device 130 detecting a trigger at one of the lobbies 107, 108, and 109 or within the elevator car 104 or 106 is able to send a message through a cellular network that eventually is received by the elevator system 100. Further, the logic in the application can store default, preset, and/or manual entries of floor destinations with respect to a user profile within the application and can cause the execution of elevator calls based on these entries as the mobile device 130 interacts with the environment of FIG. 1 and the elevator system 100. In accordance with one or more embodiments, the mobile device 130 outputs a unique signal identifying the mobile device 130 to the location devices 114, 116, 118, 120, and 122 to provide one or more event trigger sequences to the environment of FIG. 1 and the elevator system 100. An event trigger sequence is a set of ordered interactions between the mobile device 130 and the location devices 114, 116, 118, 120, and 122. The elevator system 100 can also operate automatic calls based on sequential detections of the mobile device 130 (e.g., an event trigger sequence). In this regard, the elevator system 100 can execute each segment request internally, while a user is continuously notified of each elevator assignment without user confirmation (e.g., hands-free operation).

In accordance with one or more embodiments, the environment of FIG. 1 and the elevator system 100 herein can be applied to non-smartphone type systems where a passenger's identity is automatically detected via biometric scans, facial recognition, computer chip embedded within an ID (e.g. RFID Chip) or other means (the same resulting multi-segment trip call could be executed). Using a non-smartphone type system can allow a user to be tracked and elevator calls processed and/or canceled, whether or not they are in possession of their smartphone. For example, if a video analytics system is in-place at each floor, a process flow can be executed where if a user is detected on the lower lobby 107 and then the user is detected in elevator car 104, then an elevator call for the elevator car 106 is automatically placed for the user at shared lobby 108.

Dispatching of the elevator cars 104, 106 can be managed by the computer system 110, server 140, or another system (not depicted). Therefore, the computer system 110 or server 140 may also be referred to as a dispatching system. The dispatching system can control the arrival time and location of the elevator cars 104, 106, as well as other components, such as displays, gates, turnstiles, and the like.

In accordance with one or more embodiments, a component of the elevator system 100, such as computer system 110, tracks movement and travel times of the mobile device 130, where the mobile device 130 is linked to a user account. For example, the computer system 110 can use information from location devices 116, 120, 122 to observe a travel time over a known distance 150, such as a travel time between a first location 152 where a user exits the elevator car 104 in shared lobby 108 to a second location 154 where the user boards the elevator car 106. This timing information in combination with the known distance between the first location 152 and the second location 154 enables the computer system 110 to determine a travel time of the user. Similarly, when traveling from the elevator car 106 towards the elevator car 104, predictive dispatching can be performed between the second location 154 and the first location 152. As such, either location may be referred to as the first location 152 and second location 154. Tracking this information over multiple iterations can improve the accuracy of dispatching by predictively dispatching elevator car 106 to the second location 154 aligned with the expected arrival time of the user of the mobile device 130 based on user specific travel rates learned over multiple iterations. Various associated conditions can be observed during data collection and may be incorporated into determining subsequently predicted travel times for users of mobile devices 130.

Figure 2:
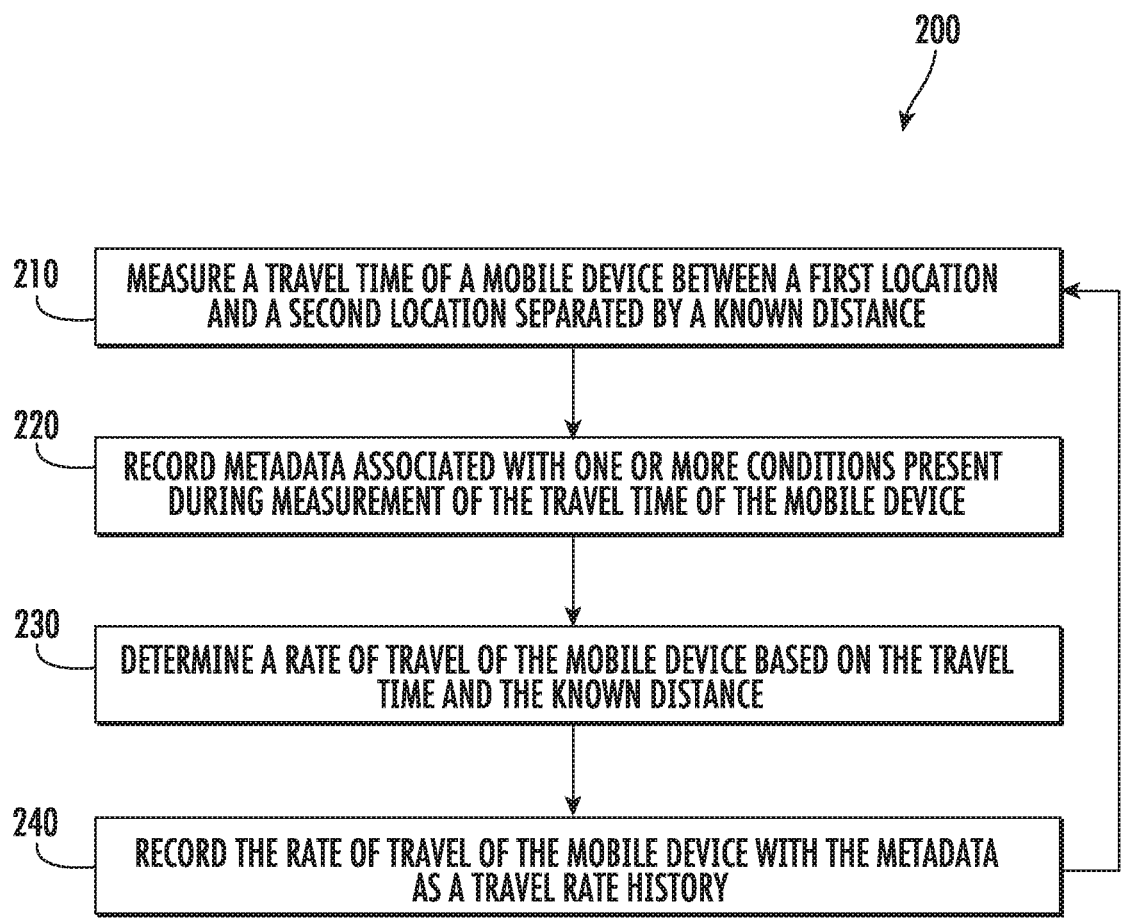
FIG. 2 is a process flow of data collection and processing according to one or more embodiments of the present disclosure.

Turning now to FIG. 2, a process flow 200 of data collection and processing for the elevator system 100 of FIG. 1 is depicted according to one or more embodiments. The process flow 200 is an example operation to collect data for supporting predictive dispatching, such as predictively requesting an elevator call based on an interaction of the mobile device 130 with one or more location devices. Note that any combination of location devices of the elevator system 100 can be utilized to construct an event trigger sequence to implement the process flow 200.

For instance, the process flow 200 can utilize the following location device combinations in a lobby focused system to the construct the event trigger sequences of (1L) a location device 114 interaction followed by a location device 116 interaction and (2L) a location device 118 interaction followed by a location device 116 interaction.

Further, the process flow 200 can utilize the following location device combinations in an elevator focused system to the construct the event trigger sequences of (1E) a location device 120 interaction followed by a location device 122 interaction and (2E) a location device 122 interaction followed by a location device 120 interaction.

Furthermore, the process flow 200 can utilize the following location device combinations in a joint lobby-elevator system to the construct the event trigger sequences of (1C) a location device 114 interaction followed by a location device 120 interaction, (2C) a location device 116 interaction followed by a location device 122 interaction, (3C) a location device 118 interaction followed by a location device 122 interaction, and (4C) a location device 116 interaction followed by a location device 120 interaction, along with utilizing the combinations (1L), (2L), (1E), and (2E) described herein.

The process flow 200 begins at block 210, where a travel time of the mobile device 130 between the first location 152 and the second location 154 separated by a known distance 150 is measured. The measurement of time can be performed using location devices of FIG. 1 or other such devices. The travel time can be computed using timestamps, a timer of the computer system 110 of FIG. 1, and/or other time source.

At block 220, a plurality of metadata associated with one or more conditions present during measurement of the travel time of the mobile device 130 can be recorded, for instance, in memory system 112. The conditions can be one or more of: a date/time condition, a level of congestion between the first location 152 and the second location 154, a weather condition (e.g., external to the facility 102), a characteristic of a space between the first location 152 and the second location 154, and/or other such conditions. Characteristics of a space between the first location 152 and the second location 154 that may be observed can include observable characteristics that impact travel time, such as the presence of a cleaning crew, lighting levels, the presence of vendors, performers, and other such potential distractions or impediments to traffic flow.

At block 230, a rate of travel of the mobile device 130 can be determined based on the travel time and the known distance 150. For example, the computer system 110 can perform the rate of travel computation.

At block 240, the rate of travel of the mobile device 130 can be recorded with the metadata as a travel rate history. The travel rate history can be stored in the memory system 112 for further use in making travel rate predictions when the mobile device 130 is subsequently observed. Alternatively, where rates of travel are not directly computed or stored, the travel time information can be stored in a travel history in the memory system 112 for further use in making travel predictions. The process flow 200 can be repeated as the mobile device 130 is observed traveling between the first location 152 and the second location 154 multiple times.

While the above description has described the process flow 200 of FIG. 2 in a particular order, it should be appreciated that the ordering of the steps may be varied. Additional steps may be included and/or the steps may be further subdivided.

Figure 3:
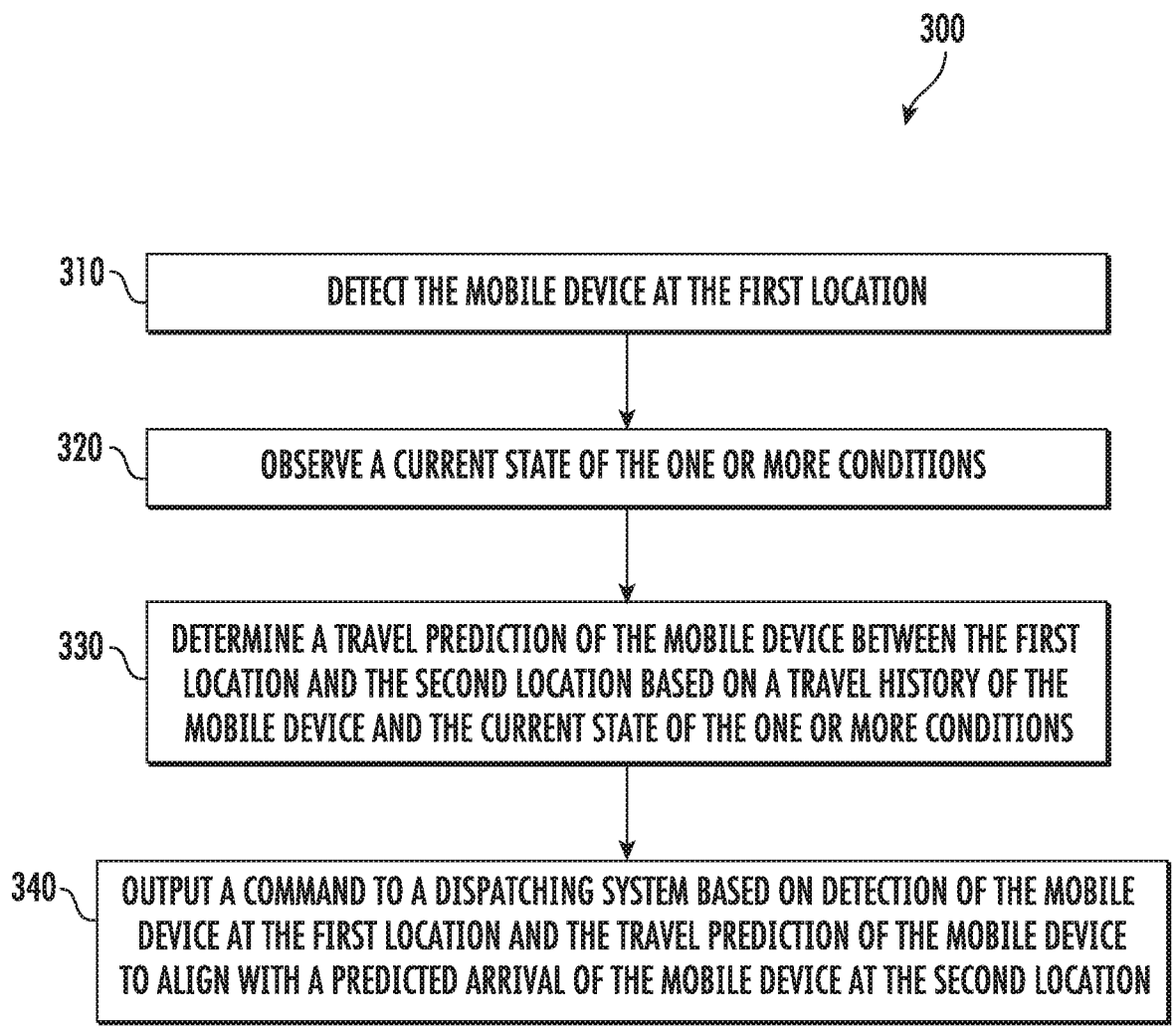
FIG. 3 is a process flow of commanding a dispatching system based on a travel prediction according to one or more embodiments of the present disclosure.

Turning now to FIG. 3 with continued reference to FIGS. 1-2, a process flow 300 of commanding a dispatching system based on a travel prediction is depicted according to one or more embodiments. The process flow 300 is an example use of the data collected in process flow 200 of FIG. 2. The process flow 300 can be performed by the computer system 110, server 140, or other such system.

The process flow 300 begins at block 310, where a mobile device 130 is detected at the first location 152. Detection can be performed through a location device or other sensing techniques. For example, a mobile device location indicator can be received at a communication interface 113 of computer system 110 from the mobile device 130, a location device, or other sensing component.

At block 320, a current state of one or more conditions present during detection of the mobile device 130 is observed. The one or more conditions can align with similar types of conditions observed as part of process flow 200, such that conditions which result in deviations of the observed rate of travel can be considered in making/adjusting a predicted travel rate of the mobile device 130. The observation of conditions may be sensor-based input to the computer system 110, such as video data, recognition of other mobile devices 130, and/or data retrieved from another system, such as server 140.

At block 330, a travel prediction of the mobile device 130 between the first location 152 and the second location 154 can be determined based on a travel history of the mobile device 130 and the current state of the one or more conditions. The travel prediction of the mobile device 130 can also be based on the metadata recorded during process flow 200. For example, the computer system 110 can identify the mobile device 130 and lookup previously recorded data. Deviations in travel rates that correspond to specific conditions may be used to improve the accuracy of predictions where similar conditions are presently observed. Where there is insufficient data previously captured for a specific mobile device 130, the prediction can use an average rate of travel consistent with other previously observed mobile devices 130 under similar conditions. In some instances, the prediction computations may start prior to detecting the mobile device 130 at the first location 152. For example, prediction determination processing may be initiated when the mobile device 130 is detected by location device 114 or location device 120 prior to reaching the first location 152. The prediction determination can use previously collected data based on previous travel times without necessarily determining a rate of travel. For instance, an average travel time of a user between two known locations can be used to predict an arrival time or travel time of the user. If travel rates are determined and distances between locations are known, then a travel time or predicted arrival time can be based on this information.

Travel predictions of the mobile device 130 can also use various associations observed relative to other mobile devices 130. For example, a mobile device group including the mobile device 130 and one or more other mobile devices 130 can be identified at the first location 152. A group time for the mobile device group to move from the first location 152 to the second location 154 can be tracked. The group time can be incorporated into a subsequent travel prediction of the mobile device 130 based on a subsequent identification of the mobile device group at the first location 152. For instance, when particular mobile devices 130 travel as a group, the travel prediction may be reduced based on to the slowest traveler within the group.

At block 340, a command is output to a dispatching system based on detection of the mobile device 130 at the first location 152 and the travel prediction of the mobile device 130 to align with a predicted arrival of the mobile device 130 at the second location 154. The dispatching system may be part of the computer system 110, server 140, or another device (not depicted). The dispatching system can be configured to control arrival and departure of a conveyance apparatus, such as elevator car 106, at the second location 154. Further, the dispatching system can be configured to output information to a display based on the predicted arrival of the mobile device 130 at the second location 154. As a further alternative, the dispatching system can be configured to enable access to an access-controlled apparatus at the second location 154 based on the predicted arrival of the mobile device 130 at the second location 154, such as opening a gate, releasing a latch, or other such automated actions.

The determination of a travel direction of the mobile device 130 may be determined in response to the initial interaction of the mobile device 130 with a first location device and a location of the first location device. For instance, if the mobile device 130 interacts with the location device 118 on the upper lobby 109 it may indicate that the mobile device is approaching the elevator shaft 105 with the intention of traveling downward, thus the travel direction of the mobile device 130 would be downward. Travel may be observed in multiple directions.

While the above description has described the process flow 300 of FIG. 3 in a particular order, it should be appreciated that the ordering of the steps may be varied. Additional steps may be included and/or the steps may be further subdivided.

As described above, embodiments can be in the form of processor-implemented processes and devices for practicing those processes, such as a processor. Embodiments can also be in the form of computer program code containing instructions embodied in tangible media, such as network cloud storage, SD cards, flash drives, floppy diskettes, CD ROMs, hard drives, or any other computer-readable storage medium, wherein, when the computer program code is loaded into and executed by a computer, the computer becomes a device for practicing the embodiments. Embodiments can also be in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into an executed by a computer, the computer becomes an device for practicing the embodiments. When implemented on a general-purpose microprocessor, the computer program code segments configure the microprocessor to create specific logic circuits.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A system comprising:
   a communication interface configured to receive a mobile device location indicator at a first location and a second location;
   a memory system configured to store a plurality of program instructions; and
   a processing system configured to execute the program instructions to cause the processing system to perform a plurality of operations comprising:
      detecting a mobile device at the first location;
      observing a current state of one or more conditions present during detection of the mobile device;
      determining a travel prediction of the mobile device between the first location and the second location based on a travel history of the mobile device and the current state of the one or more conditions;
      outputting a command to a dispatching system based on detection of the mobile device at the first location and the travel prediction of the mobile device to align with a predicted arrival of the mobile device at the second location;
      measuring a travel time of the mobile device between the first location and the second location separated by a known distance; and
      recording a plurality of metadata associated with the one or more conditions present during measurement of the travel time of the mobile device.

2. The system of claim 1, wherein the processing system is further configured to perform operations comprising:
   determining a rate of travel of the mobile device based on the travel time and the known distance; and
   recording the rate of travel of the mobile device with the metadata as a travel rate history.

3. The system of claim 2, wherein determining the travel prediction of the mobile device is based on the metadata.

4. The system of claim 1, wherein the processing system is further configured to perform operations comprising:
   identifying a mobile device group comprising the mobile device and one or more other mobile devices at the first location;
   tracking a group time for the mobile device group to move from the first location to the second location; and
   incorporating the group time into a subsequent travel prediction of the mobile device based on a subsequent identification of the mobile device group at the first location.

5. The system of claim 1, wherein the dispatching system is configured to control arrival and departure of a conveyance apparatus at the second location.

6. The system of claim 5, wherein the conveyance apparatus is an elevator car.

7. The system of claim 1, wherein the dispatching system is configured to output information to a display based on the predicted arrival of the mobile device at the second location.

8. The system of claim 1, wherein the dispatching system is configured to enable access to an access-controlled apparatus at the second location based on the predicted arrival of the mobile device at the second location.

9. A system comprising:
a communication interface configured to receive a mobile device location indicator at a first location and a second location;
a memory system configured to store a plurality of program instructions; and
a processing system configured to execute the program instructions to cause the processing system to perform a plurality of operations comprising:
detecting a mobile device at the first location;
observing a current state of one or more conditions present during detection of the mobile device;
determining a travel prediction of the mobile device between the first location and the second location based on a travel history of the mobile device and the current state of the one or more conditions; and
outputting a command to a dispatching system based on detection of the mobile device at the first location and the travel prediction of the mobile device to align with a predicted arrival of the mobile device at the second location, wherein the one or more conditions comprise one or more of: a level of congestion between the first location and the second location, a weather condition, and a characteristic of a space between the first location and the second location.

10. The system of claim 9, wherein the one or more conditions comprise a date/time condition.

11. The system of claim 9, wherein the dispatching system is configured to enable access to an access-controlled apparatus at the second location based on the predicted arrival of the mobile device at the second location.

12. A method comprising:
detecting, by a processing system, a mobile device at a first location;
observing a current state of one or more conditions present during detection of the mobile device;
determining a travel prediction of the mobile device between the first location and a second location based on a travel history of the mobile device and the current state of the one or more conditions; and
outputting a command to a dispatching system based on detection of the mobile device at the first location and the travel prediction of the mobile device to align with a predicted arrival of the mobile device at the second location, wherein the dispatching system is configured to output information to a display based on the predicted arrival of the mobile device at the second location.

13. The method of claim 12, further comprising:
measuring a travel time of the mobile device between the first location and the second location separated by a known distance; and
recording a plurality of metadata associated with the one or more conditions present during measurement of the travel time of the mobile device.

14. The method of claim 13, further comprising:
determining a rate of travel of the mobile device based on the travel time and the known distance; and
recording the rate of travel of the mobile device with the metadata as a travel rate history.

15. The method of claim 14, wherein determining the travel prediction of the mobile device is based on the metadata.

16. The method of claim 12, wherein the one or more conditions comprise one or more of: a date/time condition, a level of congestion between the first location and the second location, a weather condition, and a characteristic of a space between the first location and the second location.

17. The method of claim 12, further comprising:
identifying a mobile device group comprising the mobile device and one or more other mobile devices at the first location;
tracking a group time for the mobile device group to move from the first location to the second location; and
incorporating the group time into a subsequent travel prediction of the mobile device based on a subsequent identification of the mobile device group at the first location.

18. The method of claim 12, wherein the dispatching system is configured to control arrival and departure of a conveyance apparatus at the second location.

19. The method of claim 18, wherein the conveyance apparatus is an elevator car.

20. The method of claim 12, wherein the dispatching system is configured to enable access to an access-controlled apparatus at the second location based on the predicted arrival of the mobile device at the second location.

* * * * *